(12) United States Patent
Selfa et al.

(10) Patent No.: US 7,040,654 B2
(45) Date of Patent: May 9, 2006

(54) AIRBAG ARRANGEMENT FOR A STEERING COLUMN OR DASHBOARD

(75) Inventors: Enrique Selfa, Valencia (ES); Manuel Vales, Valencia (ES); Felix Garcia, Burjasot (ES); Vicente Bayarri, Valencia (ES)

(73) Assignee: Forrester Ketley & Co., London (GB)

( * ) Notice: Subject to any disclaimer, the term of this patent is extended or adjusted under 35 U.S.C. 154(b) by 0 days.

(21) Appl. No.: 10/480,900

(22) PCT Filed: May 29, 2002

(86) PCT No.: PCT/SE02/01018

§ 371 (c)(1),
(2), (4) Date: Apr. 12, 2004

(87) PCT Pub. No.: WO03/002383

PCT Pub. Date: Jan. 9, 2003

(65) Prior Publication Data

US 2004/0164536 A1    Aug. 26, 2004

(30) Foreign Application Priority Data

Jun. 27, 2001  (GB) ............................. 0115720.05

(51) Int. Cl.
*B60R 21/30* (2006.01)
(52) U.S. Cl. .................... 280/739; 280/728.2
(58) Field of Classification Search .............. 280/739, 280/731, 728.2, 736, 743.1
See application file for complete search history.

(56) References Cited

U.S. PATENT DOCUMENTS

| 5,234,229 | A | | 8/1993 | Gordon |
| 5,642,900 | A | * | 7/1997 | Patel ..................... 280/728.2 |
| 6,082,765 | A | | 7/2000 | Bowers et al. |
| 6,106,002 | A | * | 8/2000 | Haesaert et al. ........... 280/736 |
| 6,131,942 | A | * | 10/2000 | Fujii et al. .............. 280/728.2 |
| 6,464,247 | B1 | * | 10/2002 | Laue ..................... 280/728.2 |
| 6,588,795 | B1 | * | 7/2003 | Fischer et al. ............. 280/736 |
| 6,736,425 | B1 | * | 5/2004 | Lemon et al. ........... 280/728.2 |

FOREIGN PATENT DOCUMENTS

DE          19630855 A1 *   7/1997

* cited by examiner

*Primary Examiner*—David R. Dunn
*Assistant Examiner*—Drew Brown
(74) *Attorney, Agent, or Firm*—Madson & Austin

(57) ABSTRACT

In an air-bag arrangement in a motor vehicle a gas generator (5) has a flange (8) which is spaced from a flange member (3) by elongate spacer elements (9). The spacer elements pass through apertures (20, 21) formed in an air-bag adjacent a central aperture (19). On inflation of the air-bag, the part of the air-bag surrounding the aperture will be drawn into an engagement with the flange (8). Should a very high pressure exist within the air-bag, the part of the air-bag surrounding the aperture will be driven away from the flange (8), with part of the aperture sliding along the elongate elements (9), thus permitting excess pressure to be relieved.

12 Claims, 2 Drawing Sheets

AIRBAG ARRANGEMENT FOR A STEERING COLUMN OR DASHBOARD

BACKGROUND OF THE INVENTION

1. Field of the Invention

THE PRESENT INVENTION relates to an air-bag arrangement for a motor vehicle and more particularly relates to an air-bag arrangement suitable for mounting in front of an occupant of the motor vehicle in the steering column or the dashboard of the vehicle.

2. Description of Related Art

It is known to mount an air-bag and a gas generator arrangement in front of an occupant of the motor vehicle such that in an accident situation, the gas generator will inject gas into the air-bag to inflate the air-bag. Thus, as the torso and head of the occupant move forward rapidly, the inflated air-bag provides a cushioning effect to reduce or minimise injury to the occupant of the vehicle.

However, a problem arises with such prior air-bag arrangements when the occupant of the vehicle is not fully sitting back in the vehicle seat. For example the occupant of the vehicle may be leaning forward to obtain an item from the glove compartment or may, for any other reason, be sitting forwardly of the seat such that his head and upper torso is relatively close to the air-bag arrangement.

If an occupant of the vehicle is leaning forwardly relative to the normal position of an occupant of the seat, the rapidly inflating air-bag will impact with the occupant and further inflation of the air-bag will be resisted or prevented. Consequently the gas pressure within the air-bag will increase to a level much greater than that experienced during unimpeded inflation of the air-bag. Consequently high forces will be exerted on the part of the occupant adjacent the air-bag, which may lead to serious injuries. It is therefore desirable, after part of the occupant has impacted with the air-bag, to reduce gas pressure within the air-bag and consequently to reduce the force exerted by the inflating air-bag on the part of the occupant of the vehicle.

SUMMARY OF THE INVENTION

The present invention seeks to provide an improved air-bag arrangement.

According to the present invention there is provided an air-bag arrangement for a motor vehicle comprising an air-bag, a gas generator having a flange member and an apertured base plate member spaced a predetermined distance away from the flange member, elongate elements being provided extending between the flange member and the base plate member, the air-bag having an opening forming a throat, the air-bag also having a plurality of apertures surrounding said opening, each aperture receiving a respective said elongate element the arrangement being such that, in an accident situation, as gas from the gas generator is introduced to the air-bag, a part of the air-bag adjacent the opening moves into substantially sealing engagement with the flange member of the gas generator and such that, if the inflating air-bag impacts with an occupant of the vehicle, increasing gas pressure within the air-bag moves the part of the air-bag surrounding the opening towards the base plate member so that gas flows from the air-bag through a gas flow path defined at least partly by the space between the flange member and the base plate member.

Preferably the elongate elements comprise elongate studs each having a large diameter region inserted through a respective aperture in the air-bag, and a smaller diameter terminal region inserted in an aperture formed in the base plate member. Each stud serves as a spacer between the flange member and the base plate member.

Conveniently each stud is provided with a screw thread on which a nut is secured.

In one embodiment the elongate elements comprise studs and each stud passes through a bush which serves as a spacer between the flange member and the base plate member.

Alternatively the elongate elements comprise tabs which extend from one member to the other member.

Alternatively the elongate elements comprise protrusions extending from one member to the other, the protrusions serving as spacers between the flange member and the base plate member.

Preferably each protrusion defines an aperture through which a respective stud is inserted.

Preferably the throat is dimensioned to receive part of the gas generator.

Conveniently the throat is reinforced with an additional layer of material.

Advantageously the additional layer of material is formed of a fabric.

Alternatively the additional layer of material is formed of metal.

Alternatively the additional layer of material is formed of a plastics material.

BRIEF DESCRIPTION OF THE DRAWINGS

In order that the invention may be more readily understood, and so that further features thereof may be appreciated, the invention will now be described, by way of example, with reference to the accompanying drawings in which.

DETAILED DESCRIPTION OF THE INVENTION

Figure 1:
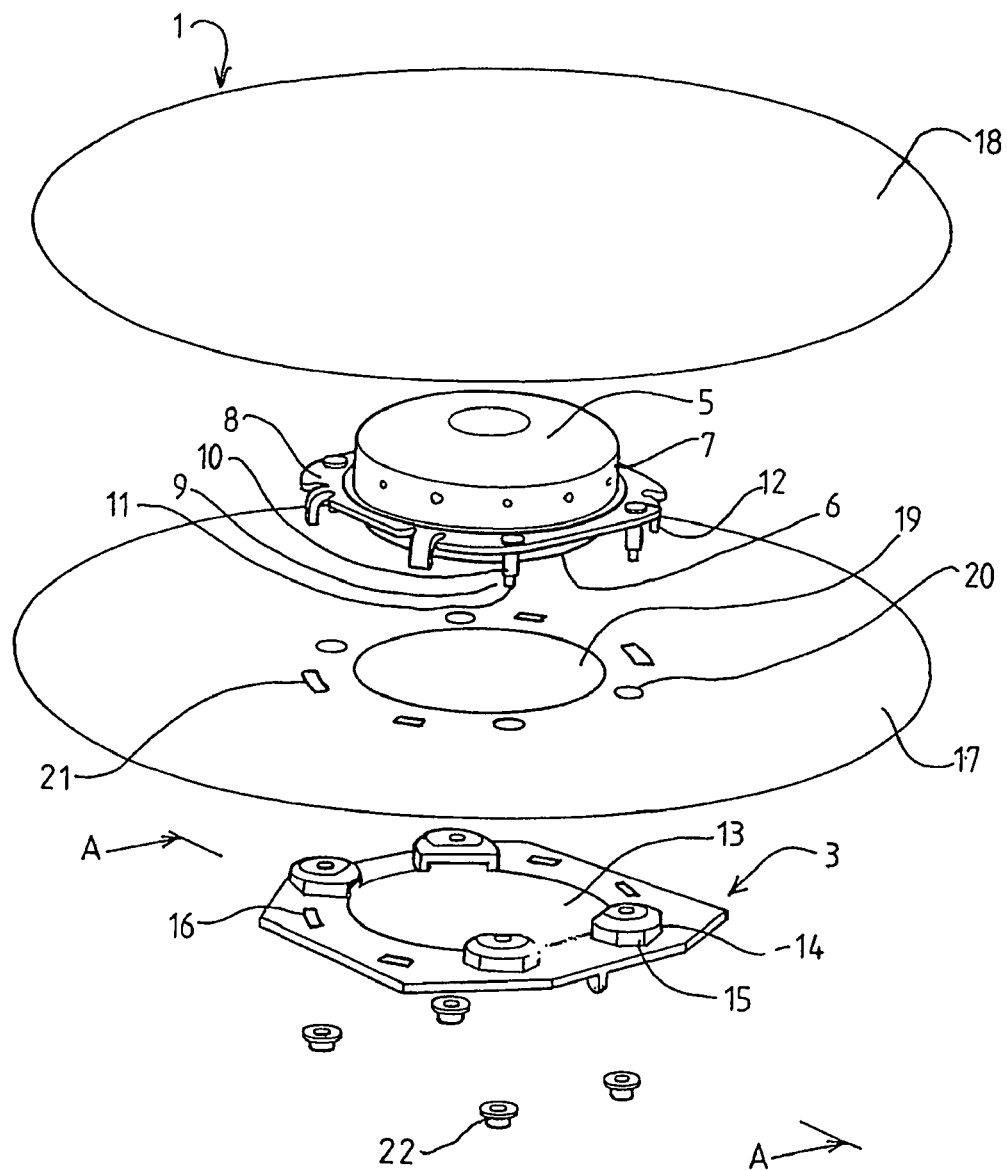
FIG. 1 is an exploded perspective view of the air-bag arrangement of the current invention.

An air-bag arrangement 1 comprises a gas generator 2, a base plate member 3 and an air-bag 4.

The gas generator 2 comprises a cylindrical housing comprising an upper circular end 5 and a lower circular end 6 interconnected by a tubular side wall 7. A substantially square flange member 8 extends radially from and surrounds the tubular side wall 7 and separates the first circular end 5 from the second circular end 6. The flange member 8 is provided with four elongate elements in the form of studs 9 which are substantially equispaced about the flange member 8. The studs 9 extend from the side of the flange member 8 closest to the second circular end 6 in a direction parallel to the tubular side wall 7 of the gas generator 2.

Each stud 9 has two regions of different diameter. The region 10 of each stud 9 closest to the flange member 8 has a relatively large diameter and the region 11 of each stud 9 remote from the flange member 8 has a relatively small diameter. The small diameter region 11 is provided with a screw thread.

Four tabs 12 also extend from the side of the flange member 8 closest to the second circular end 6 in a direction parallel to the tubular side wall 7. Two tabs 12 are located on one part of the flange member 8 between two of the studs 9 and the other two tabs 12 are located on an opposing part of the flange member between the other two studs 9.

The base plate member 3 comprises a substantially square plate of uniform thickness. The base plate member 3 has a centrally located circular aperture 13 dimensioned to receive the second circular end 6 of the gas generator 2. The upper surface of the base plate member 3 extends around the circular aperture 13 and is provided with four protrusions 14 which extend upwardly and substantially perpendicularly from the upper surface of the base plate member 3. Each protrusion 14 is provided with an axial bore 15 which extends through the protrusion 14 and through the base plate member 3. Each bore 15 is dimensioned and located to receive the smaller diameter region 11 of a respective stud 9. The upper surface of the base plate member 3 is also provided with four recesses 16 each dimensioned and located to receive a lower portion of a respective tab 12.

The air-bag 4 comprises two fabric layers 17 and 18, each fabric layer 17 and 18 comprising a circular disc of fabric. The layers of fabric 17 and 18 are superimposed and are connected at their peripheries, for example by a seam. The lower fabric layer 17 is provided with a centrally located circular opening 19 forming a throat. The circular opening 19 is dimensioned and located to receive the lower circular end 6 of the gas generator 2. Four apertures 20 are formed in the first fabric layer 17 and are equispaced about the periphery of the opening 19. The four apertures 20 are dimensioned and located such that both regions 10 and 11 of each stud 9 may be inserted through a respective aperture 20. Four further apertures 21 are also provided about the periphery of the opening 19 and are dimensioned and located such that part of each tab 12 may be inserted through a respective further aperture 21.

In assembling the air-bag arrangement, the gas generator 2 will be inserted through the opening 19 of the first fabric layer 17 so that the gas generator 2 is located within the interior of the air-bag 4. The gas generator 2 will be aligned with the first fabric layer 17 such that each stud 9 will be inserted through a respective aperture 20 of the first fabric layer 17 and such that each tab 12 will be inserted through a respective further aperture 21 of the first fabric layer 17. The second circular end 6 of the gas generator 2 may protrude through the opening 19 in the air-bag 4.

The gas generator 2 and the air-bag 4 will then be offered to the base plate member 3, the base plate member 3 being orientated such that the smaller diameter region 11 of each stud 9 may be inserted through a respective bore 15 on the base plate member 3. It is to be appreciated that, when so inserted, part of the smaller diameter region 11 of each stud 9 will extend beneath the lower surface of the base plate member 3 and a nut 22 will be screwed onto the screw thread provided on the respective lower region 11 of the respective stud 9. Each tab 12 will be received within a respective recess 16 on the base plate member 3. Thus the first fabric layer 17 of the air-bag 4 will be sandwiched between the flange member 8 of the gas generator 2 and the base plate member 3. It is to be appreciated that the larger diameter region 10 of each stud 9 will space the flange member 8 of the gas generator 2 a predetermined distance from the base plate member 3. It is also be appreciated that the tabs 12 will also assist in spacing the flange member 8 of the gas generator 2 and the base plate member 3 the same predetermined distance apart. It is envisaged that the predetermined distance apart will be between 2 millimetres and 10 millimetres.

It is to be further appreciated that, when the above arrangement is assembled as has been described, the apertures 20 and further apertures 21 provided around the periphery of the opening 19 of the fabric layer 17 of the air-bag 4 are permitted to slide along the studs 9 and the tabs 12 respectively. Thus the part of the first fabric layer 17 of the air-bag 4 adjacent to the opening 19 may move from a position adjacent the flange member 8 of the gas generator 2 to a position adjacent the base plate member 3.

Figure 2:
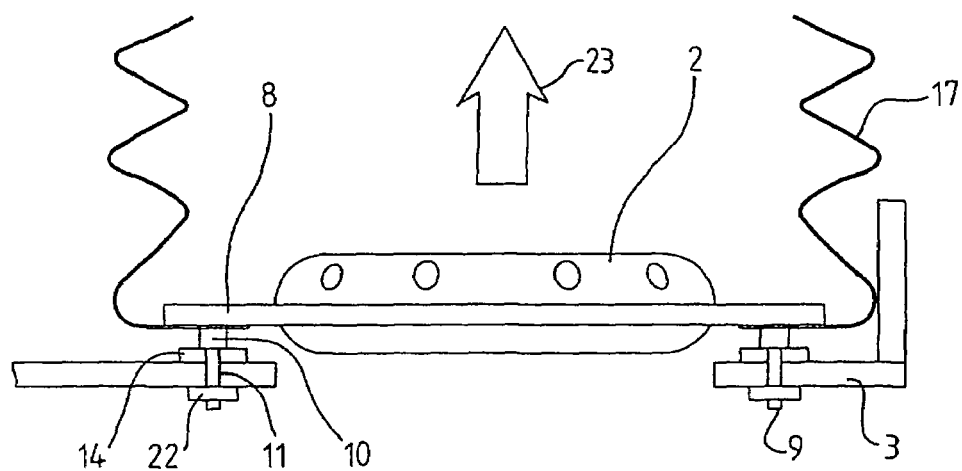
FIG. 2 is a sectional view of the air-bag arrangement taken on line A—A of FIG. 1 showing the air-bag arrangement in a first condition.

Referring now to FIG. 2, in an accident situation, gas will be injected from the gas generator 2 into the air-bag 4 in a direction substantially as shown by arrow 23. This direction of flow of gas from the gas generator 2 will give the entire air-bag momentum in the direction shown by the arrow 23 and the first fabric layer 17 will be moved along the studs 9 and tabs 12 to a position adjacent and firmly in contact with the flange member 8 of the gas generator 2. It is to be appreciated that when the fabric layer 17 of the air-bag 4 is in this position, the air-bag 4 is substantially sealed and gas from the gas generator 2 will remain substantially in the air-bag 4. Thus the air-bag will inflate in a conventional manner.

If an occupant of the vehicle is leaning forwardly of the vehicle seat and is thus relatively close to the inflating air-bag 4, the inflating air-bag 4 will impact with part of the occupant of the vehicle prior to the air-bag 4 being fully inflated. Further inflation of the air-bag 4 in the direction of the arrow 23 in FIG. 2 will be prevented or restricted and thus gas pressure within the air-bag 4 will increase. The increasing gas pressure within the air-bag 4 will move the part of the air-bag 4 adjacent the opening 19 away from sealing engagement with the flange member 8 of the gas generator 2 to a position adjacent base plate member 3. This movement will be enabled by the apertures 20 and further apertures 21 sliding along the larger diameter region 10 of the studs 9 and along the tabs 12 receptively. This is the position shown in FIG. 3.

Figure 3:
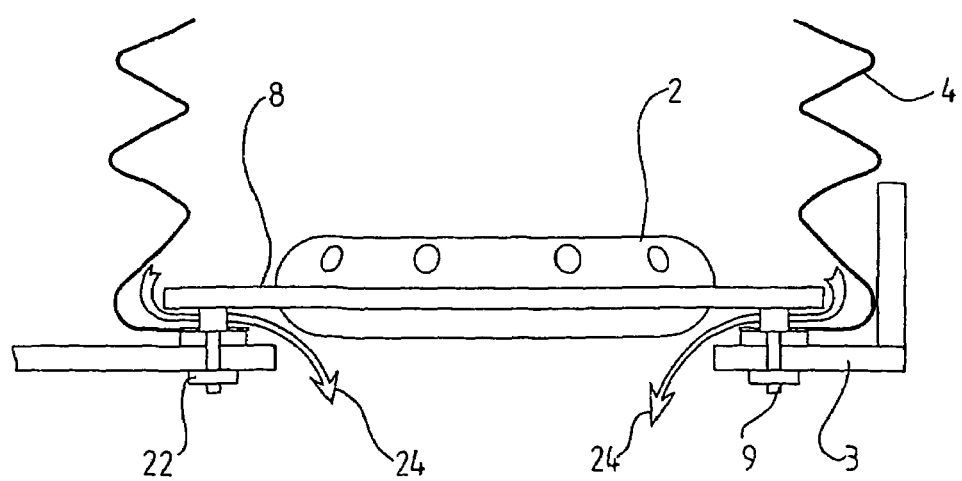
FIG. 3 is a sectional view corresponding to FIG. 2 but showing the air-bag arrangement in a second condition.

When the part of the fabric layer 17 adjacent the opening 19 is in the position shown in FIG. 3, it is to be appreciated that gas may flow from the air-bag through a gas flow path defined by the space between the flange member 8 of the gas generator 2 and the base plate member 3, the opening 19 in the air-bag 4 and the aperture 13 in the base plate member 3. This gas flow path is shown by arrows 24. This flow of gas from the air-bag will reduce the gas pressure within the air-bag 4 and thus the force exerted by the inflating air-bag 4 on the part of the occupant of the vehicle in contact with the air-bag 4 will be regulated. It is envisaged that this regulation of force will greatly reduce the risk of injuries being imparted to the occupant by the inflating air-bag 4.

It is to be appreciated that, in an alternative embodiment, the spacing between the flange member 8 of the gas generator 2 and the base plate member 3 may be effected solely by the studs 9, with the tabs 12 being omitted, or solely by the tabs 12, with the studs being of uniform section along their length. The tabs may be on the base plate member 3 instead of being on the flange member 8.

In a further alternative embodiment each stud 9 comprises a standard bolt of constant diameter which is inserted in a bush prior to being secured to the base plate member 3. The bushes serve to space the gas generator 2 and the base plate member 3 the predetermined distance apart.

In a further alternative embodiment, each protrusion 14 serves as a spacer between the flange member 8 and the base plate member 3. Each stud 9 comprises a standard bolt of constant diameter which is inserted in a respective aperture 15 formed in each protrusion 14. When assembled as has been described above, the part of the fabric layer 17 which forms the periphery of each aperture 20 is clamped between the flange member 8 and a respective protrusion 14. Thus, in an accident situation, the part of the air-bag between each protrusion 14 in an accident situation will move from a position adjacent the flange member 8 to a position adjacent the base plate member 3 to allow gas to flow out of the air-bag.

Further, it is envisaged that the periphery of the opening 19 forming the throat of the first fabric layer 17 could be reinforced with an additional layer of material. Such a material could be formed from a fabric, a plastic or a metal material.

In the present Specification "comprises" means "includes or consists of" and "comprising" means "including or consisting of".

The invention claimed is:

1. An air-bag arrangement for a motor vehicle comprising an air-bag, a gas generator having a flange member and an apertured base plate member spaced a predetermined distance away from the flange member, elongate elements being provided extending between the flange member and the base plate member, the air-bag having an opening forming a throat, the air-bag also having a plurality of apertures surrounding said opening, each aperture receiving a respective said elongate element, the arrangement being such that, in an accident situation, as gas from the gas generator is introduced to the air-bag, a part of the air-bag surrounding the opening moves into substantially sealing engagement with the flange member of the gas generator and such that, if the inflating air-bag impacts with an occupant of the vehicle, increasing gas pressure within the air-bag moves the part of the air-bag surrounding the opening towards the base plate member so that gas flows from the air-bag through a gas flow path defined at least partly by the space between the flange member and the base plate member.

2. The arrangement of claim 1 wherein the elongate elements comprise elongate studs each having a large diameter region inserted through a respective aperture in the airbag, and a small diameter terminal region inserted in an aperture formed in the base plate member.

3. The arrangement of claim 2 wherein each stud is provided with a screw thread on which a nut is secured.

4. The arrangement of claim 1 wherein the elongate elements comprise studs and wherein each stud passes through a bush which serves as a spacer between the flange member and the base plate member.

5. The arrangement of claim 1 wherein the elongate elements comprise tabs which extend between the flange member and the base plate member.

6. The arrangement of claim 1 further comprising protrusions extending between the base plate member and the flange member, the protrusions serving as spacers between the flange member and the base plate member.

7. The arrangement of claim 6 wherein each protrusion defines an aperture through which a respective stud is inserted.

8. The arrangement of claim 1 wherein the throat is dimensioned to receive part of the gas generator.

9. The arrangement of claim 1 wherein the throat is reinforced with an additional layer of material.

10. The arrangement of claim 9 wherein the additional layer of material is formed of a fabric.

11. The arrangement of claim 9 wherein the additional layer of material is formed of metal.

12. The arrangement of claim 9 wherein the additional layer of material is formed of a plastics material.

* * * * *